United States Patent [19]

Luger et al.

[11] Patent Number: 5,548,962
[45] Date of Patent: Aug. 27, 1996

[54] REFUELING PROCESS FOR CRYOGENIC LIQUIDS

[75] Inventors: Peter Luger, Höhenkirchen; Franz Grafwalliner, Tegernsee; Helmuth Peller, Höhenkirchen; Martin Müller, Höhenkirchen-Siegertsbrunn, all of Germany; Valentin V. Malyshev, Moscow, Russian Federation; Viacheslav P. Logviniouk, Moscow, Russian Federation; Vladmimir S. Ozeretskovsky, Moscow, Russian Federation; Alexander S. Shengardt, Moscow, Russian Federation

[73] Assignees: Daimler-Benz Aerospace AG, Munich, Germany; Tupolev AG, Moscow, Russian Federation

[21] Appl. No.: 396,686

[22] Filed: Mar. 1, 1995

[51] Int. Cl.[6] .................................................. F17C 7/02
[52] U.S. Cl. ............................ 62/50.1; 62/7; 62/908
[58] Field of Search ............................... 62/7, 50.1

[56] References Cited

U.S. PATENT DOCUMENTS

| 3,633,372 | 1/1972 | Kimmel et al. | 62/50.1 |
| 3,946,572 | 3/1976 | Bragg | 62/50.1 |
| 4,292,062 | 9/1981 | Dinulescu et al. | 62/7 |
| 5,365,981 | 11/1994 | Peschka et al. | 62/50.1 |

Primary Examiner—Ronald C. Capossela
Attorney, Agent, or Firm—McGlew and Tuttle, P.C.

[57] ABSTRACT

A refueling process for cryogenic liquids, in which the cryogenic liquid in question is transferred from a storage tank into a receiving tank via a detachable line connection. Before or during the refueling process, the cryogenic liquid is cooled in the storage tank to a temperature that is below the lowest operating temperature intended in the tank and above the freezing point of the liquid. The cryogenic liquid is transferred into the tank through a filter with a fineness of 5 to 40 μm, and its temperature is increased during the transfer to a value that at least approximately corresponds to the intended operating temperature in the receiving tank.

14 Claims, 1 Drawing Sheet

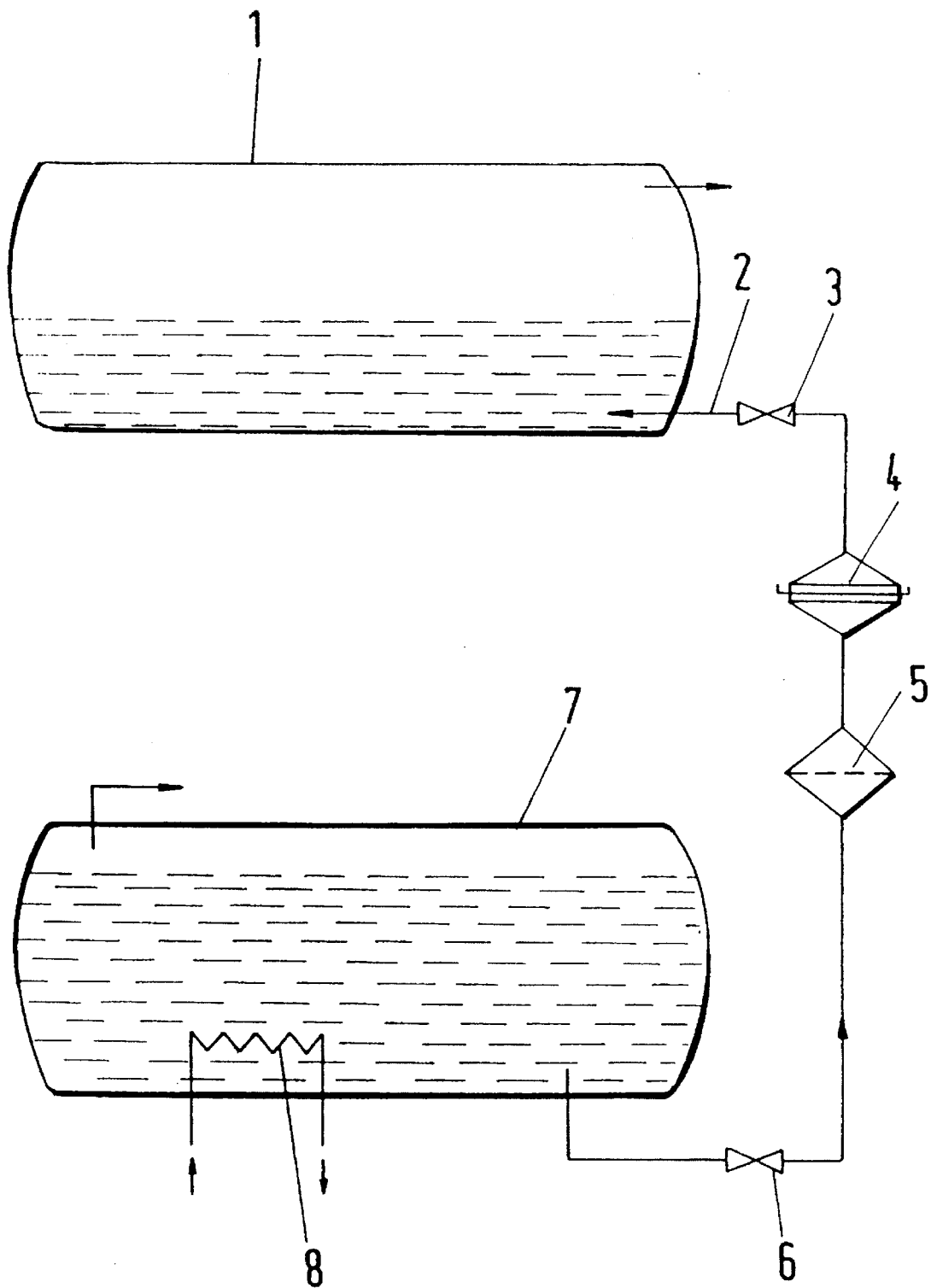

REFUELING PROCESS FOR CRYOGENIC LIQUIDS

FIELD OF THE INVENTION

The present invention pertains to a refueling process for cryogenic liquids, particularly for liquid hydrogen or liquid natural gas, for use as aircraft fuel, in which the cryogenic liquid in question is transferred from at least one storage tank via least one detachable line connection into at least one user tank, particularly an aircraft tank.

BACKGROUND OF THE INVENTION

It has been known that cryogenic liquids can be transferred from a storage tank into a user tank, e.g., a vehicle or aircraft tank, by bringing the storage tank to a higher pressure level compared with the pressure level in the user tank and maintaining the difference in pressure during the refueling process. The temperature in the storage tank may be at such a level that the liquid will start to boil in the user tank as a consequence of the decrease in pressure toward the user tank and will cool as a result. As a consequence of this cooling, foreign gases that may be present will ultimately precipitate in the solid form, e.g., as crystals. In the case of hydrogen as a cryogenic liquid, oxygen and nitrogen may be such solid impurities, which will accumulate in a highly undesirable manner due to repeating refuelings. Line elements may be frozen or blocked as a result, and a mixture of liquid hydrogen and solid oxygen crystals may lead to an explosion. Such accumulations can be eliminated and the adverse consequences can be avoided by periodically heating all the components in question. However, this requires considerable expenses for equipment and process technology.

A refueling process has also been known, in which the pressure in the storage tank is maintained at the lowest possible level under the pressure in the user tank, and the liquid is transferred into the user tank through a filter. The liquid is removed from the storage tank at points which are not possibly located in the area of solid deposits (foreign gases). The disadvantages are that the pressure in the storage tank must be maintained at a low level, and that powerful pumps, which are not available in many existing storage tanks, are necessary for the transfer (increasing the pressure).

SUMMARY AND OBJECTS OF THE INVENTION

In light of the disadvantages of these prior-art solutions, the primary object of the present invention is to provide a refueling process for cryogenic liquids, which leads, at a relatively low process technological expense, to a markedly higher purity of the cryogenic liquid and to a considerably reduced amount of solid deposits of foreign gases in the tank associated with the user and thereby increases safety during refueling and during the actual consumption operation.

According to the invention, a refueling process is provided for cryogenic liquids, particularly for liquid hydrogen or liquid natural gas for use as aircraft fuel, in which the cryogenic liquid is transferred from at least one storage tank via at least one detachable line connection into at least one tank, particularly an aircraft tank. The process comprises cooling the cryogenic liquid in the storage tank prior to the refueling process or before and during the refueling process, to a temperature that is below the lowest operating temperature intended in the tank (aircraft tank) and is higher than the freezing point of the liquid and transferring the cryogenic liquid into the tank (aircraft or transfer tank) through at least one filter wherein the filter has a fineness of 5 to 40 µm. The temperature of the cryogenic liquid is increased during the transfer, to a value that at least approximately corresponds to the intended operating temperature in the tank (aircraft tank or transfer tank).

By cooling the cryogenic liquid in the discharging storage tank to a temperature below the lowest operating temperature in the receiving tank and above its freezing point, foreign gases that may be present and may solidify in the process are extensively deposited already in the storage tank. The filter of a defined fineness arranged downstream retains solid particles that may reach the line connection in front of the tank. Due to the increase in the liquid temperature that is intended and, if desired, controlled in this case on its way from the storage tank to the tank, be it due to frictional losses, non-ideal heat insulation, deliberate supply of heat (heat exchange), etc., the solubility of foreign substances that may still be present is increased, and the tendency to settle is further reduced.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The figure shows a schematic representation of longitudinal views of a liquid-discharging storage tank and a tank receiving the liquid being discharged, as well as the line system connecting the two tanks.

DETAILED DESCRIPTION OF THE PREFERRED EMBODIMENT

The tank 1 associated with at least one user (not shown) may be installed as a mobile tank or as a stationary tank, e.g., as an aircraft tank. The same applies to the storage tank 7, which may be arranged, e.g., on a tank truck. At least one of the two tanks is usually installed as a mobile tank in order to be able to be brought close to the other tank in the case of refueling. The principle of the present invention is, of course, also applicable when there are groups of tanks that are or can be connected to one another instead of individual tanks.

According to the invention and referring to the figure, a plurality of functional elements are integrated in the connection line 2 extending from the storage tank 7 to the tank 1. A detachable coupling 4 establishes the actual connection between the storage tank-side line section and the tank-side line section. Furthermore, there are two shut-off valves 3 and 6, one for each tank. A filter 5 with a fineness of 5 to 40 µm is arranged in the storage tank-side line section.

A heat exchanger 8 with the coolant connections leading out of the tank is shown inside the storage tank 7. The tank vents are indicated by blank arrows.

The refueling process takes place as follows: The liquid temperature in the storage tank 7 is reduced to a value or refueling temperature that is under the lowest intended operating temperature in tank 1, but is still above the freezing point of the liquid. This cooling process in the storage tank is brought about by means of, e.g., an auxiliary agent flowing through the heat exchanger 8 or by periodically reducing the pressure in the tank, while part of the liquid evaporates.

Due to the fact that the solubility of the foreign gases, e.g., oxygen and nitrogen, which are present in the cryogenic liquid, e.g., hydrogen, is reduced as a result, the foreign gases precipitate from the liquid in the form of solid crystals and gradually accumulate in the area of the bottom of the storage tank.

Crystals of foreign gas that may enter the connection line 2 are retained by the filter 5. The liquid may be transferred by increasing the pressure in the storage tank 7 immediately before refueling and/or by means of pumps.

The temperature of the cryogenic liquid increases on its way from the storage tank 7 to the tank 1 as a consequence of flow losses and due to the admission of heat from the environment via the insulation, which is not ideal especially in the area of the line. The temperature can be deliberately controlled by locally specifically reducing or removing the insulation or by supplying heat in another way (e.g., via a heat exchanger).

The temperature that becomes established in the tank 1 is always markedly higher than the temperature in the storage tank 7, so that foreign gases have increased solubility and consequently show a minimal tendency to precipitate in the solid form in tank 1. This leads to a high level of operating safety of the entire tank-user system without the need to periodically heat the cryogenic liquid being stored at least in some areas (dissolution of the solid foreign substances).

The deposits of foreign gases cause no serious problem in the storage tank 7, which is, e.g., the large tank of a tank truck, because they can be deliberately drawn off/drained from the critical areas of this tank during stationary or quasi-stationary phases of the operation, or because they redissolve as a consequence of "natural" heat supply from the outside through the insulation, which is likewise not ideal, possibly supported by movements during transportation.

While a specific embodiment of the invention has been shown and described in detail to illustrate the application of the principles of the invention, it will be understood that the invention may be embodied otherwise without departing from such principles.

What is claimed is:

1. A refueling process for cryogenic liquids, including hydrogen or liquid natural gas, for use as fuel, including transfer of cryogenic liquid from a storage tank to a receiving tank via a least one detachable line connection, the process comprising the steps of: cooling the cryogenic liquid in the storage tank, prior to transfer of the cryogenic liquid, to a temperature that is below the lowest operating temperature intended for said receiving tank and is higher than the freezing point of said cryogenic liquid; and transferring the cryogenic liquid into the receiving tank through at least one filter, the filter being provided with a fineness of 5 to 40 μm for retaining crystals of foreign gas, and the temperature of said cryogenic liquid is increased during transfer from said storage tank to said receiving tank to substantially correspond to said intended operating temperature of said receiving tank.

2. A refueling process according to claim 1, wherein said step of cooling said cryogenic liquid includes cooling said cryogenic liquid in said storage tank during said step of transferring.

3. A refueling process according to claim 1, wherein said step of cooling includes cooling said cryogenic liquid at least up to a time just before said step of transferring.

4. A refueling process for cryogenic liquids, including hydrogen or liquid natural gas for use as aircraft fuel, including transfer of cryogenic liquid from a refueling tank to a aircraft tank via a least one detachable line connection, the process comprising the steps of: cooling the cryogenic liquid in the refueling tank, prior to transfer of the cryogenic liquid, to a temperature that is below the lowest operating temperature intended for said aircraft tank and is higher than the freezing point of said cryogenic liquid; and transferring the cryogenic liquid into the aircraft tank through at least one filter, the filter being provided with a fineness of 5 to 40 μm for retaining any crystals of foreign gas, and the temperature of said cryogenic liquid is increased during transfer from said refueling tank to said aircraft tank to substantially correspond to said intended operating temperature of said aircraft tank.

5. A method for reducing foreign gas crystallization in a user tank caused by refueling, the method comprising the steps of:

providing a storage tank containing cryogenic liquid;

providing a user tank capable of receiving cryogenic liquid;

connecting said storage tank to said user tank for communication of the cryogenic liquid from said storage tank to said user tank;

determining a minimum operating temperature of said user tank;

transferring the cryogenic liquid from said storage tank to said user tank;

blocking crystals of foreign gases present in the cryogenic liquid of said storage tank, which crystals of foreign gases crystalize in said user tank above said minimum operating temperature, from flowing into said user tank.

6. A method in accordance with claim 5, wherein:

said blocking of said foreign gases is performed by crystallizing said foreign gases present in the cryogenic liquid of said storage tank into foreign gas crystals and filtering said foreign gas crystals from the cryogenic liquid transferred to said user tank.

7. A method in accordance with claim 6, wherein:

said crystallizing is performed by maintaining the cryogenic liquid at a refueling temperature during said filtering, said refueling temperature being below said minimum operating temperature.

8. A method in accordance with claim 7, wherein:

said cryogenic liquid is cooled to said refueling temperature.

9. A method in accordance with claim 7, wherein:

said cryogenic liquid is cooled in said storage tank during said transferring.

10. A method in accordance with claim 7, wherein:

said cryogenic liquid is cooled before and until said transferring.

11. A method in accordance with claim 7, wherein:

said refueling temperature is above a freezing point of the cryogenic fluid.

12. A method in accordance with claim 7, further comprising:

heating the cryogenic fluid after said filtering to said minimum operating temperature.

13. A method in accordance with claim 6, wherein:

said filtering uses filters having a fineness of 5 to 40 μm.

14. A method in accordance with claim 5, further comprising:

storing the cryogenic liquid in said storage tank at a temperature above said minimum operating temperature.

* * * * *

UNITED STATES PATENT AND TRADEMARK OFFICE
CERTIFICATE OF CORRECTION

PATENT NO. : 5,548,962
DATED : August 27, 1996
INVENTOR(S) : LUGER et al.

It is certified that error appears in the above-indentified patent and that said Letters Patent is hereby corrected as shown below:

On the title page, please insert the following:

--[30] Foreign Application Priority Data

March 2, 1994 [RU] Russia ..... 94 007 266--.

Signed and Sealed this

Eighteenth Day of March, 1997

Attest:

BRUCE LEHMAN

*Attesting Officer*     *Commissioner of Patents and Trademarks*